US012320142B1

(12) United States Patent
Curran

(10) Patent No.: US 12,320,142 B1
(45) Date of Patent: Jun. 3, 2025

(54) MODULAR FENCE SYSTEM

(71) Applicant: Richard Curran, Fort Lauderdale, FL (US)

(72) Inventor: Richard Curran, Fort Lauderdale, FL (US)

( * ) Notice: Subject to any disclaimer, the term of this patent is extended or adjusted under 35 U.S.C. 154(b) by 505 days.

(21) Appl. No.: 17/885,992

(22) Filed: Aug. 11, 2022

Related U.S. Application Data

(60) Provisional application No. 63/232,470, filed on Aug. 12, 2021.

(51) Int. Cl.

*E04H 17/18* (2006.01)
*A47C 13/00* (2006.01)
*E03B 9/20* (2006.01)
*E04H 17/00* (2006.01)
*E04H 17/16* (2006.01)
*F21S 9/03* (2006.01)

(52) U.S. Cl.

CPC ......... *E04H 17/185* (2021.01); *A47C 13/005* (2013.01); *E03B 9/20* (2013.01); *E04H 17/009* (2021.01); *E04H 17/165* (2013.01); *F21S 9/03* (2013.01)

(58) Field of Classification Search

CPC ......... E04H 17/00; E04H 17/14; E04H 17/16; E04H 17/1602; E04H 17/165; E04H 17/17; E04H 17/18; E04H 17/185; E04H 17/22; E01F 13/02; E01F 13/022

See application file for complete search history.

(56) References Cited

U.S. PATENT DOCUMENTS 300,929 A * 6/1884 Whistler ................. E04H 17/16 256/29
419,567 A * 1/1890 Turner .................... E04H 17/18 256/26
709,215 A * 9/1902 Gentslinger .......... E04H 17/163 256/28
765,729 A * 7/1904 Graham .................. E04H 17/16 256/73

(Continued)

FOREIGN PATENT DOCUMENTS

DE 19511906 A1 * 10/1996 ......... E04G 21/3214
DE 19956433 A1 * 6/2001 ............. E04H 17/10

(Continued)

*Primary Examiner* — Jonathan P Masinick

(74) *Attorney, Agent, or Firm* — John Rizvi; John Rizvi, P.A.—The Patent Professor ®

(57) ABSTRACT

A modular fence system is disposable into a freestanding enclosure on a supporting surface without the use of any tools and includes a fence panel assembly having a plurality of fence panels each having a frame with a plurality of fence slats mounted therein. A plurality of fence support units each have a frame interface and a frame support. Each frame interface is disposable between adjacent fence panels and each frame support is positionable into a freestanding relation with the supporting surface. A plurality of toggle clamps are disposable between a disengaged configuration for positioning around portions of adjacent fence panels and/or interfaces disposed thereinbetween, and a releasably secure engaged configuration to maintain the frames of adjacent ones of the plurality of fence panels and the frame interface operably disposed thereinbetween in an interconnected freestanding configuration.

20 Claims, 9 Drawing Sheets

(56) References Cited

U.S. PATENT DOCUMENTS

| | | | | | |
|---|---|---|---|---|---|
| 1,168,836 | A | * | 1/1916 | Vette | A01M 23/18 256/25 |
| 1,251,926 | A | * | 1/1918 | Schlesinger | E04H 17/18 119/513 |
| 1,429,774 | A | * | 9/1922 | Rhoades | E04H 17/18 256/73 |
| 1,458,260 | A | * | 6/1923 | Wilson | E04H 17/18 256/27 |
| 2,581,318 | A | * | 1/1952 | Bartlett | E04H 17/18 256/25 |
| 4,145,031 | A | | 3/1979 | Baker, II | |
| 4,498,660 | A | | 2/1985 | Brena et al. | |
| 5,058,863 | A | * | 10/1991 | Maffet | F16B 5/0685 256/26 |
| 5,331,725 | A | * | 7/1994 | Chou | F16B 2/22 24/339 |
| 5,454,538 | A | | 10/1995 | Moore | |
| 5,651,534 | A | | 7/1997 | Yoder | |
| 5,718,414 | A | | 2/1998 | Deloach et al. | |
| 6,540,209 | B2 | * | 4/2003 | Ross | E04H 17/18 256/73 |
| 6,832,752 | B2 | | 12/2004 | Xuzzocrea | |
| 7,055,806 | B2 | * | 6/2006 | York, Jr. | E01F 13/022 256/28 |
| 7,080,201 | B2 | | 8/2006 | Brucker | |
| 7,216,854 | B2 | | 5/2007 | Bryan | |
| 7,231,954 | B2 | * | 6/2007 | Green | E01F 13/022 52/63 |
| 7,347,412 | B1 | | 3/2008 | Zhu | |
| 11,384,576 | B2 | * | 7/2022 | Escure | E05D 5/08 |
| 11,386,244 | B2 | * | 7/2022 | Knudsen | G06F 30/12 |
| 11,560,734 | B2 | * | 1/2023 | Blackett | B41J 3/407 |
| 2002/0027225 | A1 | | 3/2002 | Sotillos et al. | |
| 2008/0038048 | A1 | * | 2/2008 | Pingel | F16B 41/002 403/24 |
| 2011/0290194 | A1 | * | 12/2011 | Gardner | E04H 17/18 256/25 |
| 2015/0225912 | A1 | * | 8/2015 | Nunes | A63K 1/00 29/525.01 |

FOREIGN PATENT DOCUMENTS

| | | | | | |
|---|---|---|---|---|---|
| DE | 202011100030 | U1 | * | 9/2011 | E04H 17/161 |
| DE | 102011017437 | A1 | * | 12/2011 | E04H 17/161 |
| DE | 202011052375 | U1 | * | 7/2012 | E04H 17/161 |
| DE | 102013004915 | B4 | * | 1/2017 | E04H 17/161 |
| EP | 0347388 | A1 | * | 12/1989 | |
| EP | 0524860 | A1 | | 1/1993 | |
| EP | 3808421 | A1 | * | 4/2021 | A63C 19/005 |
| FR | 2682698 | A3 | * | 4/1993 | E01F 13/02 |
| GB | 2414034 | A | * | 11/2005 | E04H 17/161 |
| GB | 2458312 | A | * | 9/2009 | E04H 12/2215 |
| JP | 2008291464 | A | * | 12/2008 | |
| KR | 101095059 | B1 | | 12/2011 | |
| WO | WO-2013157923 | A1 | * | 10/2013 | E01F 13/022 |
| WO | WO-2015157800 | A1 | * | 10/2015 | E01F 13/022 |
| WO | WO-2015176122 | A1 | * | 11/2015 | E01F 13/022 |
| WO | WO-2020040064 | A1 | * | 2/2020 | A47C 1/14 |

* cited by examiner

MODULAR FENCE SYSTEM

CROSS-REFERENCE TO RELATED APPLICATION

This application claims the benefit of U.S. Provisional Patent Application Ser. No. 63/232,470 filed on Aug. 12, 2021, which is incorporated by reference herein in its entirety.

FIELD OF THE INVENTION

The present invention relates generally to a modular fence system.

BACKGROUND OF THE INVENTION

Fencing or other barriers may be constructed around a specified area on a site for any of a variety of reasons including access control, security, privacy, aesthetics, and even simply for advertisement purposes, such as, to announce new construction on a site and/or other coming attractions to an area.

Fencing and other barriers may be permanent, such as are common around residential, commercial and government buildings and/or properties. Fencing and other barriers may also be installed for temporary purposes such as for access control and/or security such as is common around construction and building restoration sites, which are typically of a semi-permanent nature as construction projects may last for months, or even years. Alternatively, fencing may be constructed at a site for a single event such as a concert, street fair, emergency response, etc., wherein the installation and removal of a fencing system may all occur within a matter of a few days or even less.

Fencing and other barriers may be constructed from a variety of materials including, but not limited to, wood, metal, such as galvanized aluminum, brick, concrete and even plastics or plastic composites. A common form of fencing, for use in both temporary and permanent access control and security, is the now ubiquitous chain link fence, such as are typically constructed of aluminum or galvanized aluminum. Reliance on chain link fencing system is a result of their relative low cost to manufacture, as well as their versatility in enclosing sites having irregular boundaries. Given the rather crude and unfinished nature of chain link fences, the loose ends of numerous aluminum fence wires often protrude at least partially outward therefrom providing a point for clothing of passers-by to be snagged, or worse, to be cut thereon.

Despite the relatively low cost in the manufacture and installation of even the simplest of chain link fencing systems, numerous tools are required, some highly specialized, thus requiring person skilled in the use of the same to install or at least oversee the installation of a chain link fence. The tools typically required for the installation of even the most simple chain link fencing system include but are in no manner limited to, a post hole digger, a sledge hammer to install posts, a wheelbarrow, one or more shovels and hoes to mix and transport concrete to secure posts in position, a hacksaw and/or a pipe cutter, string, plump line, mason line, and stakes, crescent wrench, pliers, wire cutters, a fence stretcher, etc. Considerable labor, and again, including at least some specialized labor, are also required to install even the most basic of chain link fencing systems.

While arguably effective for access control and/or security purposes, it is well understood that chain link fencing systems in and of themselves do not provide any degree of privacy, such is often desired when installing a fencing system. As such, oftentimes individual slats are woven through chain link fencing for aesthetic purposes and/or in order to provide at least some degree of privacy to the enclosed area. Of course, this results in increased costs in the chain link fencing system itself, both in upfront costs and in subsequent maintenance as such individual slats are commonly damaged during installation, or subsequent to installation by the elements, vandalism, etc.

Alternatively, plastic or canvas sheeting may be utilized to cover all or at least readily accessible portions of a chain link fencing system, once again, for aesthetic purposes and/or in order to provide some degree of privacy to the enclosed area. Furthermore, such plastic or canvas sheeting systems are often utilized to display information regarding a construction project or other event occurring within the enclosed area around which the chain link fencing system is installed.

Of course, installation of such plastic or canvas sheeting systems require attaching the plastic or canvas sheeting to the chain link fence at numerous intermittent intervals along its length which is, once again, labor intensive to install, thereby increasing the cost of installing a chain link fencing system. Further, such sheeting is highly susceptible to detachment from the chain link fence under the force of wind or, once again, vandalism, thereby increasing the maintenance costs associated with such systems.

An additional problem occurs when installing a temporary chain link fencing system on concrete or asphalt because a chain link fencing system require posts to be driven into the ground at predetermined intervals. As will be appreciated, this may result in cracks in the concrete or asphalt, thus resulting in potentially costly repairs, or worse, irreparable damage to thereto once the temporary chain link fencing system is removed.

Accordingly, there is an established need for a solution to one or more of the foregoing shortcomings in the prior art.

SUMMARY OF THE INVENTION

The present invention is generally directed to a modular fence system disposable into a freestanding enclosure without tools.

In a first implementation of the invention, a modular fence system disposable into a freestanding enclosure on a supporting surface without tools may comprise: a fence panel assembly comprising a plurality of fence panels each having a frame with a plurality of fence slats mounted therein; a plurality of fence support units each having a frame interface and a frame support, each of the frame interfaces operably disposable between adjacent ones of the plurality of fence panels, and each of the frame supports positionable into a freestanding relation with the supporting surface; and a plurality of toggle clamps each disposable between a disengaged configuration for positioning around a portion of the frame of adjacent ones of the plurality of fence panels and the frame interface of the fence support unit operably disposed thereinbetween, and a releasably secure engaged configuration to maintain the portion of the frame of adjacent ones of the plurality of fence panels and the frame interface operably disposed thereinbetween in an interconnected freestanding configuration.

In a second aspect, the modular fence system can include a plurality of fence panels having a plurality of fence slats, wherein at least some of a plurality of fence slats are opaque.

In another aspect, the modular fence system may have a plurality of fence panels having a plurality of fence slats, wherein each of a plurality of fence slats are opaque.

In a further aspect, the modular fence system can include a plurality of fence panels having a plurality of fence slats, wherein at least some of the plurality of fence slats comprise at least a portion of a visible indicia applied directly thereon.

In one other aspect, the modular fence system may have at least one closed wall comprising at least some of a plurality of fence panels interconnected to one another in an interconnected freestanding configuration.

In yet another aspect, the modular fence system can include a plurality of closed walls each comprising at least some of a plurality of fence panels interconnected to one another in an interconnected freestanding configuration.

In still one further aspect, the modular fence system may have a plurality of closed walls, wherein adjacent ones of some of the plurality of closed walls are interconnected to one another thereby at least partially defining a freestanding enclosure.

In yet one other aspect, the modular fence system can include at least one access wall interconnected between oppositely disposed ones of a plurality of closed walls, thereby further defining a freestanding enclosure.

In still another aspect, the modular fence system may have an access wall including at least one access panel at least partially defining an access way in to and out of a freestanding enclosure.

In yet one further aspect, the modular fence system can include an access wall having a plurality of access panels at least partially defining an access way in to and out of a freestanding enclosure.

In still one other aspect, the modular fence system may have a plurality of toggle clamps including a closed portion, oppositely disposed side portions, a first open portion and a second open portion, the first open portion being resilient to facilitate positioning the toggle clamp around a portion of a frame of adjacent ones of a plurality of fence panels and an interface operably disposed thereinbetween.

In yet another aspect, the modular fence system can include a plurality of toggle clamps having a handle interconnected thereto via a pivot joint, the handle disposable between an open orientation, thereby disposing the toggle clamp into a disengaged configuration, and a closed orientation, thereby disposing the toggle clamp into a releasably secure engaged configuration.

In still one further aspect, the modular fence system may have a bench assembly including at least one bench mounted between an oppositely disposed pair of end support units.

In yet one other aspect, the modular fence system can include a bench assembly having a plurality of benches, wherein adjacent ones of the plurality of benches are interconnected to one another via a center support unit, and are mounted between oppositely disposed end support units.

In still another aspect, the modular fence system may have one or more end support units, wherein each end support unit comprises a fence panel interface disposable between a frame of each of different adjacent ones of a plurality of fence panels.

In yet one further aspect, the modular fence system can include a drinking fountain assembly having at least one drinking fountain mounted to a fountain panel and disposable into an interconnected relation between oppositely disposed ones of a plurality of fence panels.

In still one other aspect, the modular fence system may have a drinking fountain assembly including a plurality of drinking fountains each mounted to a different one of a plurality of fountain panels and each disposable into an interconnected relation between different oppositely disposed ones of a plurality of fence panels.

In yet another aspect, the modular fence system can include a solar lighting assembly having at least one solar lighting unit mounted to a portion of one of a plurality of fence panels.

In still one further aspect, the modular fence system may have a solar lighting assembly having a plurality of solar lighting units each mounted to a portion of one of a plurality of fence panels.

In another implementation, a modular fence system disposable into a freestanding enclosure on a supporting surface without tools can include: a fence panel assembly comprising a plurality of fence panels each having a frame with a plurality of fence slats mounted therein; a plurality of fence support units each having a frame interface and a frame support, each of the frame interfaces operably disposable between adjacent ones of the plurality of fence panels, and each of the frame supports positionable into a freestanding relation with the supporting surface; a plurality of toggle clamps each disposable between a disengaged configuration for positioning around a portion of the frame of adjacent ones of the plurality of fence panels and the frame interface of the fence support unit operably disposed thereinbetween, and a releasably secure engaged configuration to maintain the portion of the frame of adjacent ones of the plurality of fence panels and the frame interface operably disposed thereinbetween in an interconnected freestanding configuration; a plurality of closed walls each comprising at least some of the plurality of fence panels interconnected to one another in the interconnected freestanding configuration, wherein adjacent ones of some of the plurality of closed walls are interconnected to one another thereby at least partially defining the freestanding enclosure; and at least one access wall interconnected between oppositely disposed ones of the plurality of closed walls, the at least one access wall comprising at least one access panel at least partially defining an access way therethrough, thereby further defining the freestanding enclosure.

In yet one further implementation, a modular fence system disposable into a freestanding enclosure on a supporting surface without tools may comprise: a fence panel assembly comprising a plurality of fence panels each having a frame with a plurality of fence slats mounted therein; a plurality of fence support units each having a frame interface and a frame support, each of the frame interfaces operably disposable between adjacent ones of the plurality of fence panels, and each of the frame supports positionable into a freestanding relation with the supporting surface; a plurality of toggle clamps each disposable between a disengaged configuration for positioning around a portion of the frame of adjacent ones of the plurality of fence panels and the frame interface of the fence support unit operably disposed thereinbetween, and a releasably secure engaged configuration to maintain the portion of the frame of adjacent ones of the plurality of fence panels and the frame interface operably disposed thereinbetween in an interconnected freestanding configuration; each of the plurality of toggle clamps comprising a closed portion, oppositely disposed side portions, a first open portion and a second open portion, the first open portion being resilient to facilitate positioning the toggle clamp around a portion of the frame of adjacent ones of the plurality of fence panels and the frame interface of the fence support unit operably disposed thereinbetween; each of the plurality of toggle clamps further comprising a handle interconnected thereto via a pivot joint, the handle disposable between an open orientation, thereby disposing the toggle clamp into the disengaged configuration, and a closed orientation, thereby disposing the toggle clamp into the releasably secure engaged configuration; a plurality of closed walls each comprising at least some of the plurality of fence panels interconnected to one another in the interconnected freestanding configuration, wherein adjacent ones of some of the plurality of closed walls are interconnected to one another thereby at least partially defining the freestanding enclosure; and at least one access wall interconnected between oppositely disposed ones of the plurality of closed walls, the at least one access wall comprising at least one access panel at least partially defining an access way therethrough, thereby further defining the freestanding enclosure.

These and other objects, features, and advantages of the present invention will become more readily apparent from the attached drawings and the detailed description of the embodiments, which follow.

BRIEF DESCRIPTION OF THE DRAWINGS

The embodiments of the invention will hereinafter be described in conjunction with the appended drawings provided to illustrate and not to limit the invention, where like designations denote like elements, and in which.

Like reference numerals refer to like parts throughout the several views of the drawings.

DETAILED DESCRIPTION

The following detailed description is merely exemplary in nature and is not intended to limit the described embodiments or the application and uses of the described embodiments. As used herein, the word “exemplary” or “illustrative” means “serving as an example, instance, or illustration.” Any implementation described herein as “exemplary” or “illustrative” is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms “upper”, “lower”, “top”, “bottom”, “left”, “right”, “front”, “rear”, “vertical”, “horizontal”, and derivatives thereof shall relate to the invention as oriented in FIGS. 1 and 2. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Shown throughout the figures, the present invention is directed generally to a modular fence system disposable into a freestanding enclosure without tools. More in particular, the present modular fence system, generally as shown as at 100 throughout the figures, is disposable into a freestanding enclosure 119 on a supporting surface SS in a staging area SA, such as is shown by way of example in FIG. 1, without the need for or use of any tools, i.e., the entire freestanding enclosure 119 may be assembled, and subsequently disassembled, by hand. It is noteworthy that the present modular fence system 100 may be utilized to construct a permanent or temporary freestanding enclosure 119 on a supporting surface, wherein the supporting surface may include soil or sand or even gravel, concrete or asphalt.

Figure 1:
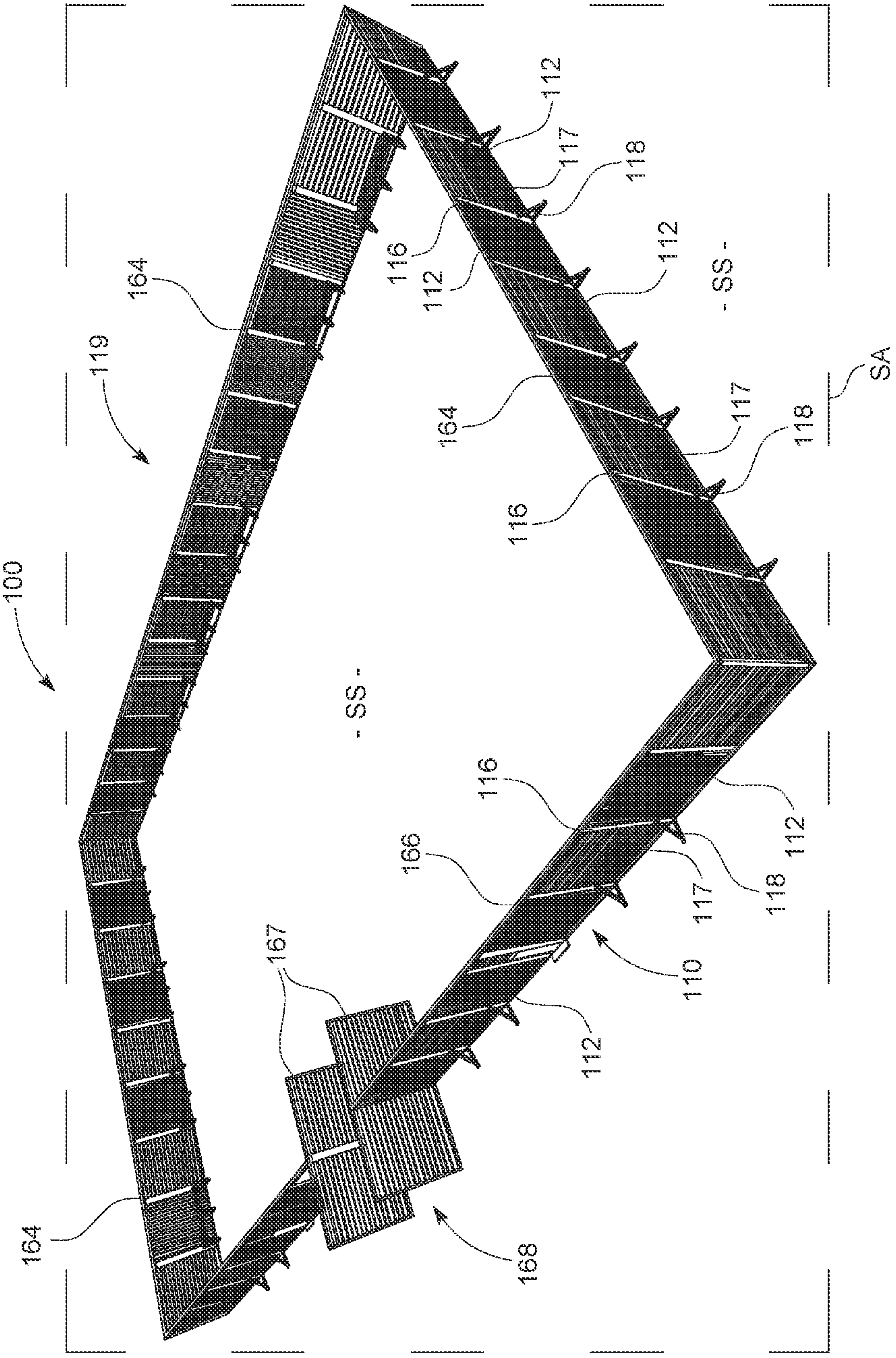
FIG. 1 presents a perspective view of one illustrative embodiment of a modular fence system disposed into a freestanding enclosure on a supporting surface, in accordance with the present invention.
Figure 2:
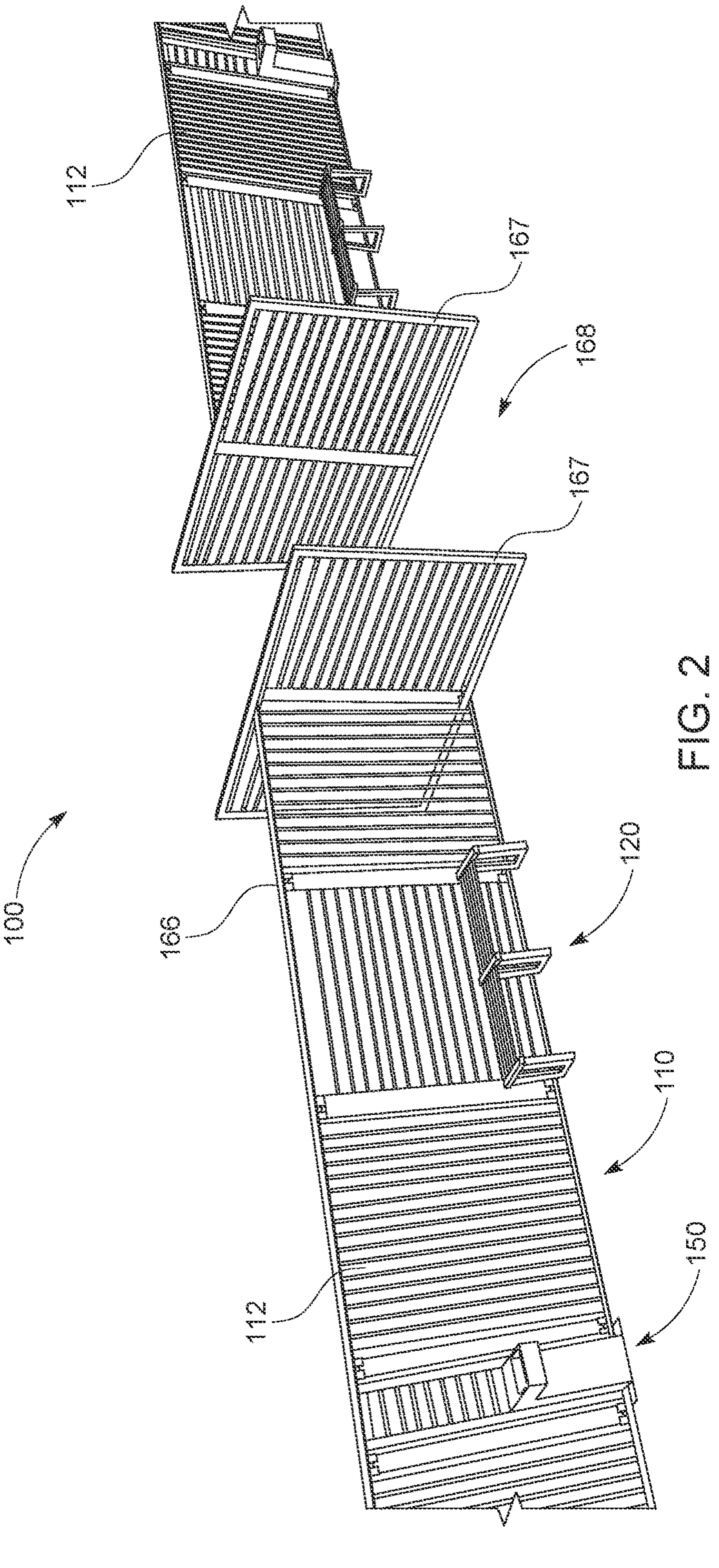
FIG. 2 presents a perspective view of a portion of one illustrative embodiment of an access wall of the modular fence system of FIG. 1, in accordance with the present invention.

With continued reference to FIG. 1, and as stated above, the present invention is directed to a modular fence system 100 which is disposable into a freestanding enclosure 119, once again, without the need for or use of any tools. In at least one embodiment, a modular fence system 100 includes a fence panel assembly 110. A fence panel assembly 110 in accordance with the present invention includes a plurality of fence panels 112, such as are shown, by way of example, in the illustrative embodiment of FIG. 1.

Figure 10A:
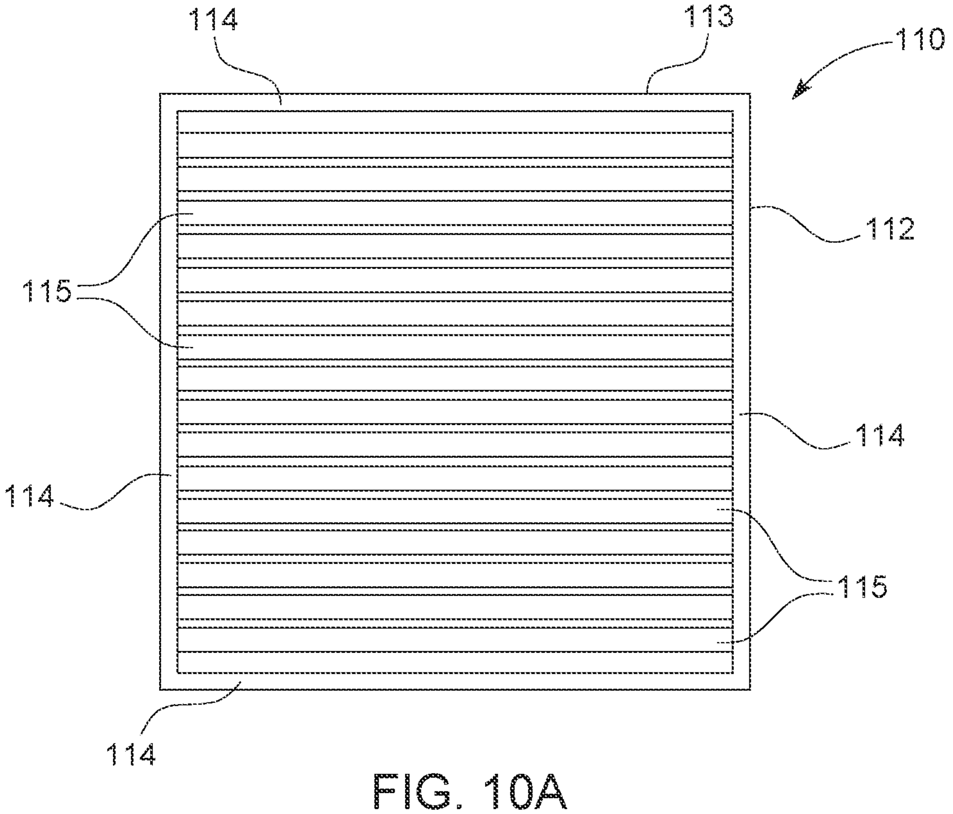
FIGS. 10A and 10B present elevations of one illustrative embodiment of a fence panel of a modular fence system having a plurality of fence slats mounted in a horizontal orientation and having a plurality of fence slats mounted in a vertical orientation, respectively, in accordance with the present invention.
Figure 10B:
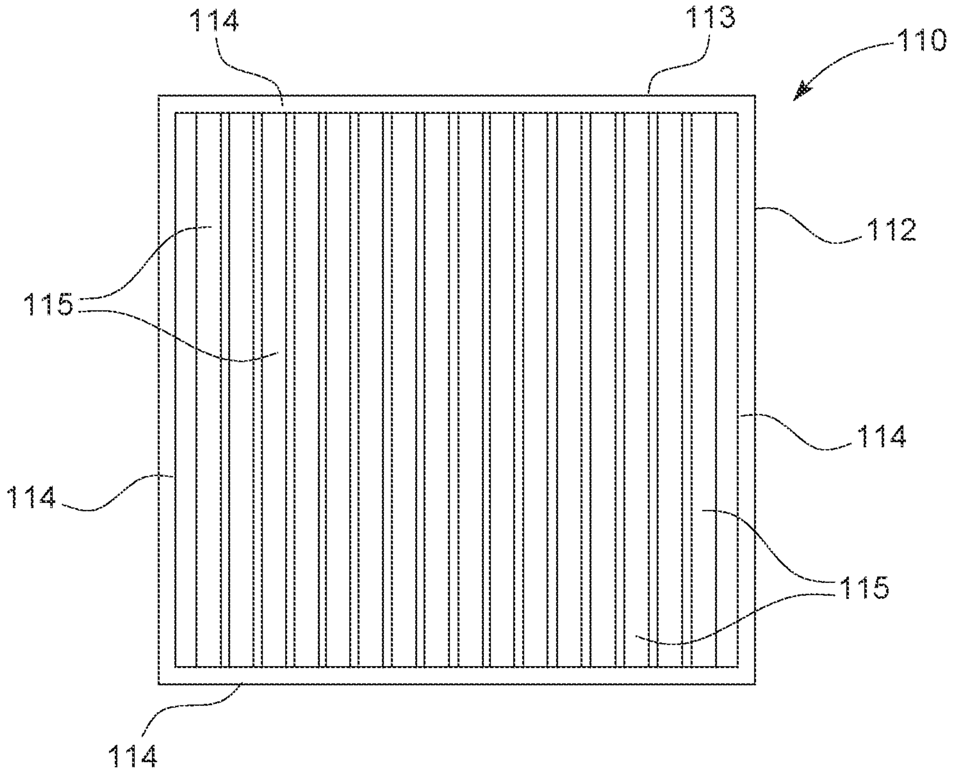

A fence panel 112 in accordance with the present invention includes a frame 113 having at least one frame member 114. A frame 113 in accordance with the present invention may include a plurality of frame members 114. With reference to FIGS. 10A and 10B, a frame 113 of the fence panel 112 in accordance with at least one embodiment of the present invention comprises a plurality of frame members 114, wherein the plurality of frame members 114 are arranged relative to one another such that the frame 113 comprises a generally square configuration. As will be appreciated, a plurality of frame members 114 may be arranged relative to one another to form a frame 113 comprising other geometric configurations including, but not limited to rectangular, hexagonal, etc.

A fence panel 112 in accordance with the present invention comprises one or more fence slats 115 mounted to a frame 113. In one embodiment, at least some of a plurality of fence slats 115 of a fence panel 112 comprise an opaque material of construction and/or coating such that a freestanding enclosure 119 constructed from fence panels 112 in accordance with the present invention provides at least some degree of privacy. In a further embodiment, each of a plurality of fence slats 115 of a fence panel 112 comprise an opaque material of construction and/or coating such that a freestanding enclosure 119 constructed from fence panels 112 in accordance with the present invention provides a further degree of privacy. In still another embodiment, each of a plurality of fence slats 115 is arranged in a partially overlapping orientation relative to one another such that a freestanding enclosure 119 constructed from fence panels 112 in accordance with the present invention provides complete privacy, i.e., there is no line of sight through the adjacent fence slats 115 such a person on the outside of the freestanding enclosure 119 can visually observe what is transpiring inside of the freestanding enclosure 119.

Looking again to the illustrative embodiment of FIG. 10A, the plurality of fence slats 115 are mounted in a horizontal orientation relative to the frame 113 of the fence panel 112. With reference to the illustrative embodiment of FIG. 10B, the plurality of fence slats 115 are mounted in a vertical orientation relative to the frame 113 of the fence panel 112. As will be appreciated, a plurality of fence slats 115 may be mounted to a frame 113 of a fence panel 112 in a variety of other orientations including but not limited to diagonal, crisscross, checkerboard, etc.

It is to be appreciated that each frame member 114 of a frame 113 in accordance with the present invention may be constructed of any variety of materials of construction provided it exhibits sufficient strength and rigidity to support one or more fence slats 115 mounted therein. As such, each frame member 114 of a frame 113 in accordance with the present invention may be constructed of metal, metal alloys, wood, wood composites, plastics, fiberglass and/or engineered composite materials, just to name a few. It is to be further appreciated that each frame member 114 of a frame 113 in accordance with the present invention may be secured to one another via any of a plurality of mechanical fastening mechanisms including, but not limited to, nails, bolts, screws, cotter pins, rivets, welds, solder, heat welds, adhesives, etc. In at least one embodiment of the present invention, a plurality of frame members 114 of the frame 113 comprise a unitary construction with one another. A frame member 114 in accordance with the present invention may comprise a material of construction having a desired color and/or weather resistant properties. Alternatively, a frame member 114 may be coated with a decorative and/or weather resistant coating as may be required for a specific application.

It is to be further appreciated that each fence slat 115 of a fence panel 112 in accordance with the present invention may also be constructed of any variety of materials of construction provided it exhibits sufficient strength and rigidity so as to prevent unauthorized access in to an area enclosed by a freestanding enclosure 119 in accordance with the present invention. As such, a fence slat 115 of a fence panel 112 in accordance with the present invention may be constructed of metals, metal alloys, wood, wood composites, plastics, fiberglass and/or engineered composite materials, just to name a few. Each fence slat 115 of a fence panel 112 in accordance with the present invention may be secured to a frame 113 via any of a plurality of mechanical fastening mechanisms including, but not limited to, nails, bolts, screws, rivets, welds, solder, heat welds, adhesives, tongue and groove connections, etc. In at least one embodiment of the present invention, a plurality of fence slats 115 of a fence panel 112 comprise a unitary construction with one another. A fence slat 115 in accordance with the present invention may comprise a material of construction having a desired color and/or weather resistant properties. Alternatively, and as noted above with regard to frame members 114, fence slats 115 may be coated with a decorative and/or weather resistant coating as may be required for a specific application. As one example, each frame member 114 and the plurality of fence slats 115 of a fence panel 112 may comprise an aluminum finish. As another example, frame members 114 may comprise an aluminum finish, while a plurality of fence slats 115 comprise a natural or faux wood finish.

As before, a modular fence system 100 in accordance with the present invention is disposable into a freestanding enclosure 119 comprising a plurality of fence panels 112 of a fence panel assembly 110. At least some of the plurality of fence panels 112 are interconnected to one another in an interconnected freestanding configuration so as to form a wall of the freestanding enclosure 119. A plurality of panel support units 116 are provided to facilitate interconnecting a plurality of fence panels 112 into an interconnected freestanding configuration, such as is shown by way of example in FIG. 1. More in particular, a panel support unit 116 in accordance with the present invention comprises a panel interface 117. A panel interface in at least one embodiment comprises an elongated configuration and extends upwardly from the panel support unit 116. More in particular, a panel interface 117 is dimensioned and configured to be disposed between frame members 114 of adjacent fence panels 112, and to be releasably secured therein via one or more toggle clamp 140, as is discussed in greater detail hereinafter. A panel support unit 116 in accordance with at least one embodiment of the present invention further comprises a panel support 117. More in particular, a panel support 118 of a panel support unit 116 is positionable into a supported relation to a supporting surface so as to at least partially support a plurality of fence panels 112 interconnected thereto in an interconnected freestanding configuration.

At least some of the plurality of fence panels 112 are interconnected to one another in an interconnected freestanding configuration so as to form a closed wall 164. In at least one embodiment, a freestanding enclosure 119 includes a plurality of closed walls 164, each comprising at least some of the plurality of fence panels 112 of the fence panel assembly 110 interconnected to one another in an interconnected freestanding configuration, as best shown in FIG. 1. As is further shown in the illustrative embodiment of FIG. 1, adjacent ones of the plurality of closed walls 164 are interconnected to one another thereby at least partially defining the freestanding enclosure 119.

A freestanding enclosure 119 in accordance with the present invention may further comprise at least one access wall 166. Similar to a closed wall 164, an access wall 166 also includes at least some of the plurality of fence panels 112 interconnected to one another in an interconnected freestanding configuration. However, unlike a closed wall 164, an access wall 166 in accordance with the present invention includes at least one access panel 167 which is positioned relative to an adjacent fence panel 112 so as to at least partially define an access way 168 in to and out of the freestanding enclosure 119. In at least one embodiment, an access wall 166 comprises a plurality of access panels 167 oppositely disposed from one another and positioned relative to a corresponding adjacent one of the plurality of fence panels 112 so as to further define an access way 168 in to and out of the freestanding enclosure 119 such as is shown best by way of example in the illustrative embodiments of FIGS. 1 and 2. As further shown in FIGS. 1 and 2, each of access panels 167 is positioned perpendicular to the corresponding adjacent one of the plurality of fence panels 112, once again, so as to further define an access way 168 in to and out of the freestanding enclosure 119.

A modular fence system 100 disposable into a freestanding enclosure 119 in accordance with at least one further embodiment of the present invention further comprises a bench assembly 120. A bench assembly 120 in accordance with the present invention includes at least one bench 122. In one embodiment, a bench assembly 120 of a modular fence system 100 in accordance with the present invention comprises a plurality of benches 122. A bench 122 in accordance with at least one embodiment of the present invention comprises one or more bench slats 123 extending between opposite ends of the bench 122. In one further embodiment, a bench 122 includes oppositely disposed bench mounts 124 each being interconnected to one end of the bench slats 123 along opposite sides of the bench 122, such as is shown best in FIG. 3.

Similar to frame members 114 and fence slats 115, bench slats 123 and bench mounts 124 in accordance with the present invention may be constructed of any variety of materials of construction provided it exhibits sufficient strength and rigidity to support the weight of the number of persons the bench 122 is intended to accommodate. As such, each bench slat 123 and bench mount 124 in accordance with the present invention may be constructed of metal, metal alloys, wood, wood composites, plastics, fiberglass and/or engineered composite materials, just to name a few. It is to be further appreciated that each of bench slats 123 which form a bench 122 in accordance with the present invention may be secured to corresponding ones of the oppositely disposed bench mounts 124 via any of a plurality of mechanical fastening mechanisms including, but not limited to, nails, bolts, screws, rivets, welds, solder, heat welds, adhesives, tongue and groove connections, etc. In at least one embodiment of the present invention, a plurality of bench slats 123 of a bench 122 comprise a unitary construction with corresponding ones of the oppositely disposed bench mounts 124. A bench 122 and/or components thereof may comprise a material of construction having a desired color and/or weather resistant properties, for example, so as to match a color and/or weather resistant properties of an adjacent fence panel 112. Alternatively, and as before, a bench 122 may be coated with a decorative and/or weather resistant coating as may be required for a specific application.

In at least one embodiment, a modular fence system 100 includes a bench assembly 120 having at least one bench 122 mounted between oppositely disposed end support units 126. In yet one further embodiment, a modular fence assembly 100 includes a bench assembly 120 having a plurality of benches 122, wherein adjacent ones of the plurality of benches 122 are interconnected to one another via a center support unit 132. Further, and as is demonstrated in the illustrative embodiment of FIG. 3, a plurality of benches 122 may also be mounted between oppositely disposed end support units 126.

An end support unit 126 in accordance with the present invention includes at least one end mount 127. More in particular, an end mount 127 is cooperatively dimensioned and configured with a bench mount 124 of a bench 122 to facilitate releasably interconnecting a bench mount 124 of a bench 122 to an end support unit 126. In at least one embodiment, an end mount 127 comprises an elongated channel formed into a portion of an end support unit 126, and in one further embodiment, an end mount 127 is disposed in a generally horizontal orientation. With reference again to FIG. 3, an end mount 127 is dimensioned and configured to receive a bench mount 124 of a bench 122 therein. In at least one further embodiment, an end mount 127 is dimensioned and configured to receive a bench mount 124 of a bench 122 therein, and to retain the bench mount 124 of the bench 122 therein via a friction fit.

An end support unit 126 in accordance with the present invention further comprises an end support 128. More in particular, an end support 128 of an end support unit 126 is positionable into a supported relation to a supporting surface so as to at least partially support the weight of one or more persons seated or standing on a bench 122 interconnected to the end support unit 126.

An end support unit 126 in one further embodiment comprises a fence panel interface 129. With reference once again to FIG. 3, a fence panel interface 129 of an end support unit 126 comprises an elongated configuration and extends upwardly from the end support unit 126. More in particular, a fence panel interface 129 is dimensioned and configured to be disposed between frame members 114 of adjacent fence panels 112, and to be releasably secured thereinbetween via one or more toggle clamps 140, once again, as is discussed in greater detail hereinafter.

In yet one further embodiment, an end support unit 126 also comprises a fence panel support 130. Similar to a panel support 118 and an end support 128, a fence panel support 130 of an end support unit 126 is also positionable into a supported relation to a supporting surface so as to at least partially support the adjacent fence panels 112 to which a fence panel interface 129 of an end support unit 126 is releasably secured in an interconnected freestanding orientation.

Figure 3:
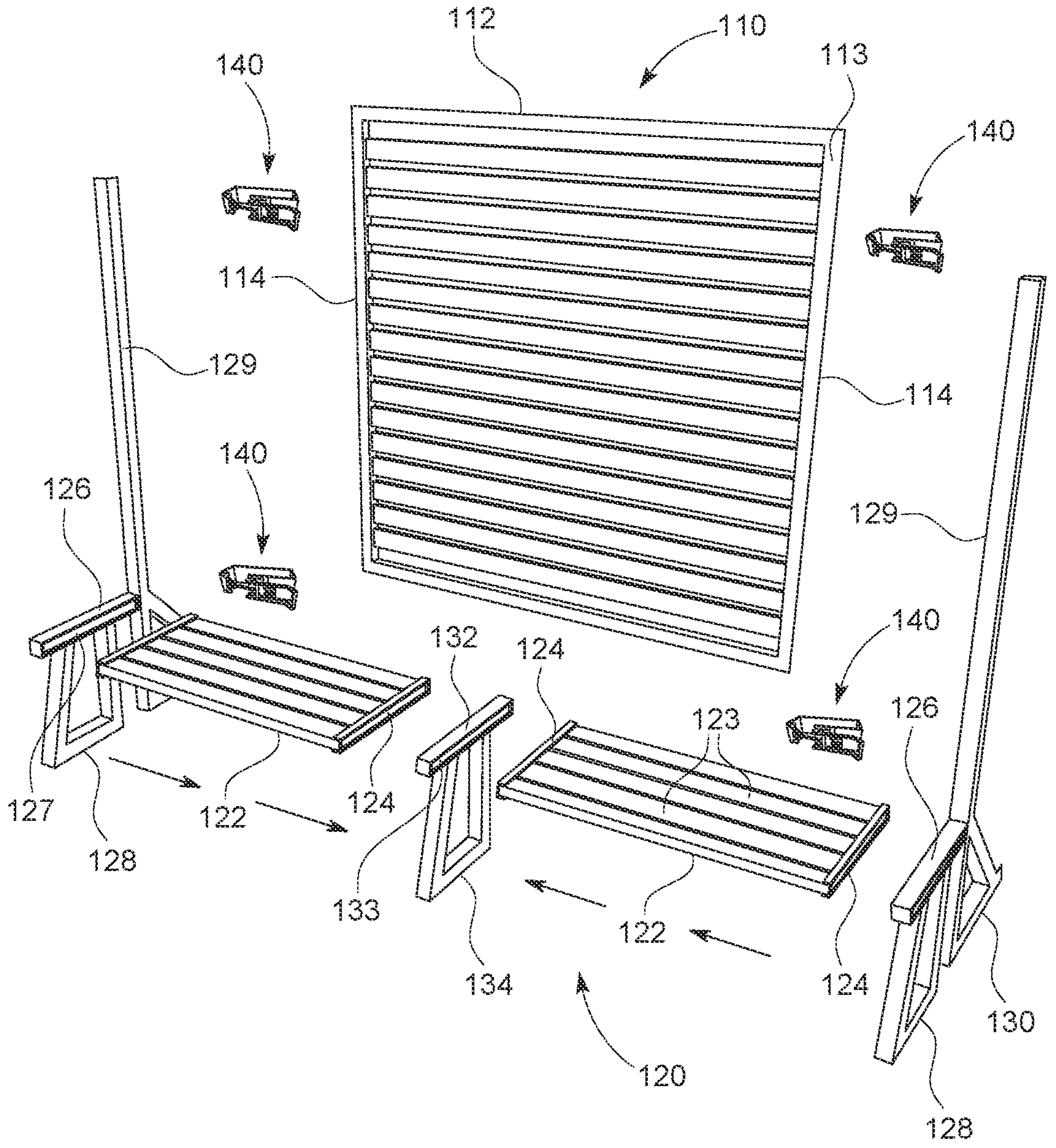
FIG. 3 presents a partially exploded perspective view of one illustrative embodiment of a bench assembly of a modular fence system, in accordance with the present invention.

With reference again to the illustrative embodiment of FIG. 3, and as disclosed hereinabove, a bench assembly 120 in accordance with at least one embodiment of the present invention comprises a center support unit 132. As before, a center support unit 132 serves to interconnect adjacent ones of a plurality of benches 122 of the bench assembly 120 to one another. Similar to end support unit 126, a center support unit 132 in accordance with at least one embodiment of the present invention comprises at least one center mount 133 cooperatively dimensioned and configured with a bench mount 124 of a bench 122 to facilitate releasably interconnecting a bench mount 124 of a bench 122 to a center support unit 132. In at least one embodiment, a center mount 133 comprises an elongated channel formed into a portion of a center support unit 132, and in one further embodiment, a center mount 133 is disposed in a generally horizontal orientation, also similar to an end mount 127. With reference again to FIG. 3, a center mount 133 is dimensioned and configured to receive a bench mount 124 of a bench 122 therein. In at least one further embodiment, a center mount 133 is dimensioned and configured to receive a bench mount 124 of a bench 122 therein, and to retain the bench mount 124 of the bench 122 therein via a friction fit. A center support unit 132 in at least one embodiment comprises a center mount 133 disposed on opposite sides thereof, wherein each center mount 133 is dimensioned and configured to receive a bench mount 124 of a different bench 122 therein, and to retain a bench mount 124 of a corresponding bench 122 therein via a friction fit.

Figure 4A:
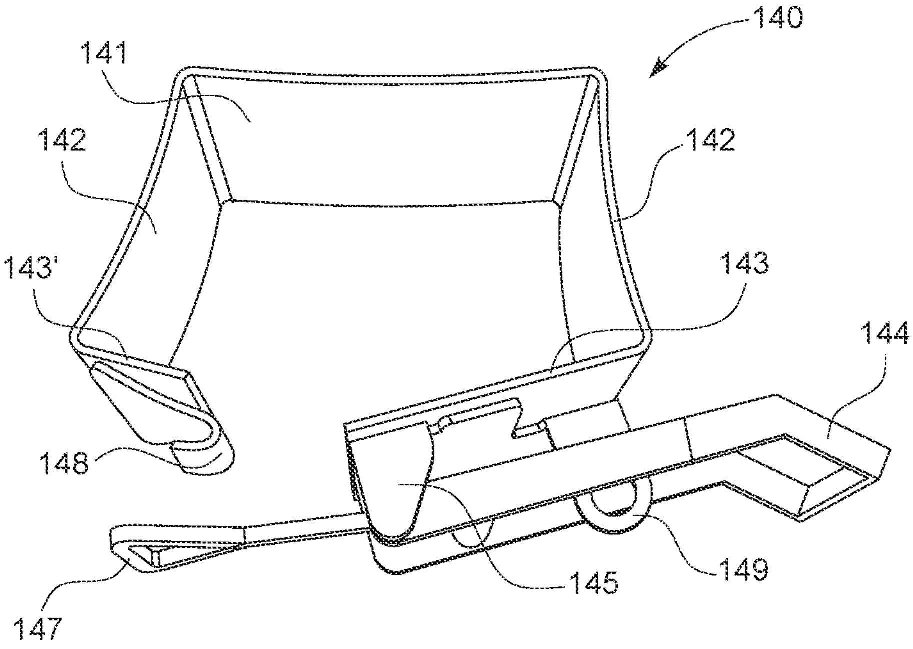
FIGS. 4A through 4C present perspective views of one illustrative embodiment of a toggle clamp of a modular fence system disposed in various disengaged configurations, in accordance with the present invention.
Figure 4B:
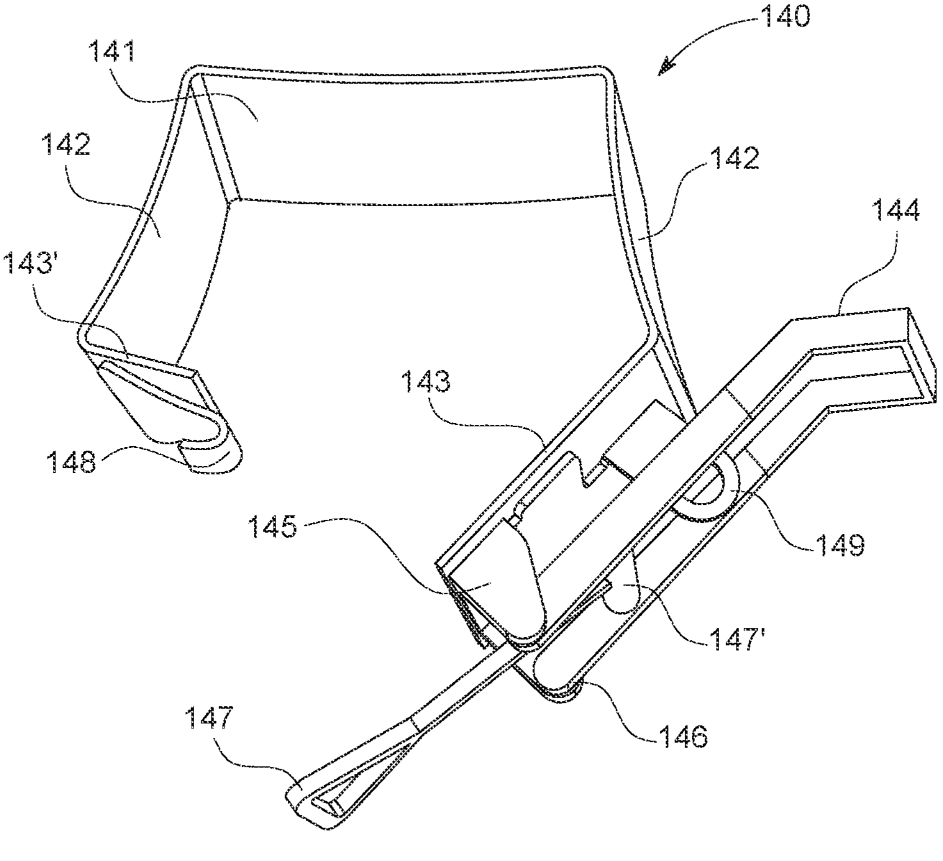
Figure 4C:
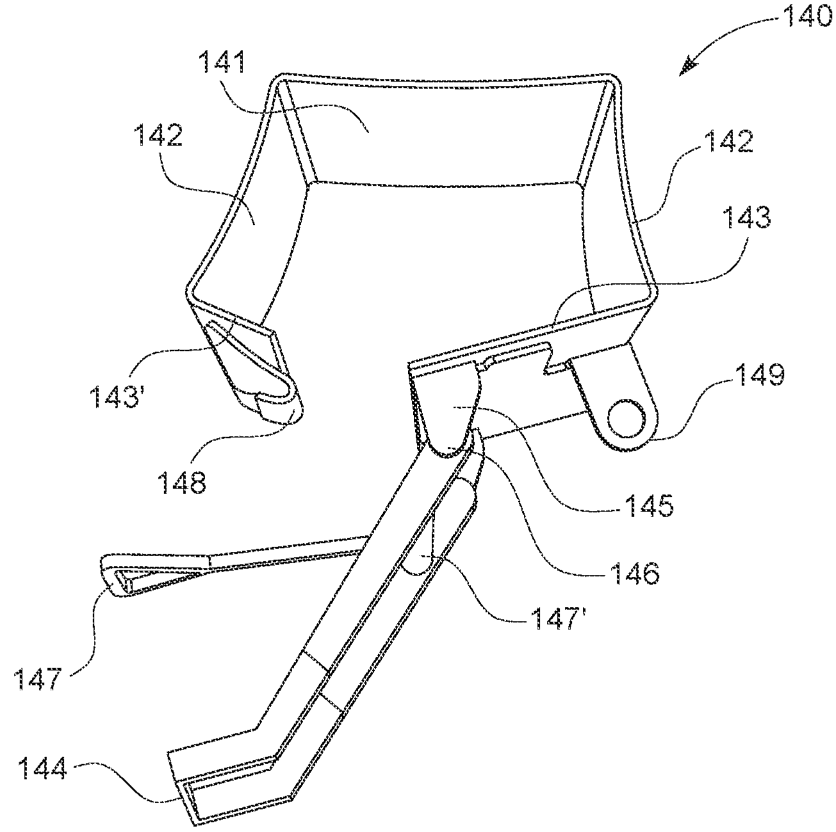

FIGS. 4A through 4C present perspective views of one illustrative embodiment of a toggle clamp 140 of a modular fence system 100 disposed in various open disengaged configurations, in accordance with the present invention. More in particular, and with reference first to FIG. 4A, a toggle clamp 140 is shown disposed in a substantially retracted disengaged configuration with a handle 144 and a yoke 147 disposed in a closed orientation. As may also be seen from FIG. 4A, in one embodiment, a toggle clamp 140 includes a closed wall or closed portion 141 and oppositely disposed side walls or side portions 142 attached at opposite ends thereof. As further shown in the illustrative embodiment of FIG. 4A, a toggle clamp 140 comprises a first open wall or first open portion 143 and a second open wall or second open portion 143' each attached to a different one of the oppositely disposed side portions 142.

Looking next to FIG. 4B, a toggle clamp 140 is shown disposed in a substantially expanded disengaged configuration with a handle 144 and a yoke 147 disposed in a closed orientation. In one embodiment, at least a first open portion 143 comprises a resilient material of construction, such as aluminum or plastic, so as to permit disposition of the toggle clamp 140 from the substantially retracted disengaged configuration of FIG. 4A to the substantially expanded disengaged configuration of FIG. 4B. In one further embodiment, each of a first open portion 143 and a second open portion 143' comprise a resilient material of construction, once again, so as to permit disposition of the toggle clamp 140 from a substantially retracted open disengaged configuration to a substantially expanded disengaged configuration. In yet one further embodiment, one or both of side portions 142 may also comprise a resilient material of construction.

A toggle clamp 140 includes a handle mount 145 to secure a handle 144 to a portion of the toggle clamp 140. With reference once again to FIG. 4B, in at least one embodiment, a toggle clamp 140 includes a handle mount 145 to secure handle 144 to a first open portion 143 of the toggle clamp 140. One or more handle pivot joints 146 are provided to moveably secure a handle 144 to a handle mount 145. More in particular, handle pivot joint(s) 146 permit a handle 144 to be disposed from a closed orientation, such as is shown in FIGS. 4A and 4B, into an open orientation, such as is shown best in FIG. 4C.

A toggle clamp 140 in one embodiment further includes a yoke 147 moveably secured thereto. Looking again to FIGS. 4B and 4C, in one embodiment, a yoke pivot joint 147' is provided to pivotally secure a yoke 147 to a portion of a handle 144 of a toggle clamp 140. With continued reference to FIGS. 4B and 4C, the yoke pivot joint 147' allows the yoke 147 to pivot between the closed orientation, such as is shown in FIGS. 4A and 4B, into an open orientation, such as is shown best in FIG. 4C. As will be appreciated, when a toggle clamp 140 is disposed in a substantially expanded disengaged configuration such as is shown in FIGS. 4B and 4C, the toggle clamp 140 may be positioned around adjacent frame members 114, such as is shown by way of example in the illustrative embodiment of FIG. 5, and/or around adjacent frame members 114 having one or more panel interfaces 117, 129 disposed thereinbetween.

As will be further appreciated, a toggle clamp 140 in accordance with the present invention may be provided in a variety of different sizes to accommodate releasably securing different components of a modular fence system 100 in accordance with the present invention to one another, as needed for a particular installed configuration. In at least one embodiment, a closed wall or closed portion 141 may comprise shorter or longer lengths as needed to be positionable around and to releasably secure additional components to one another, such as frame members 114 having one or more frame interface 117, 129 disposed thereinbetween. In one further embodiment, one or more of a closed portion 141, oppositely disposed side portions 142 or open portions 143, 143' may comprise greater or lesser widths, once again as may be needed to accommodate releasably securing different components of a modular fence system 100 in accordance with the present invention to one another.

Figure 5:
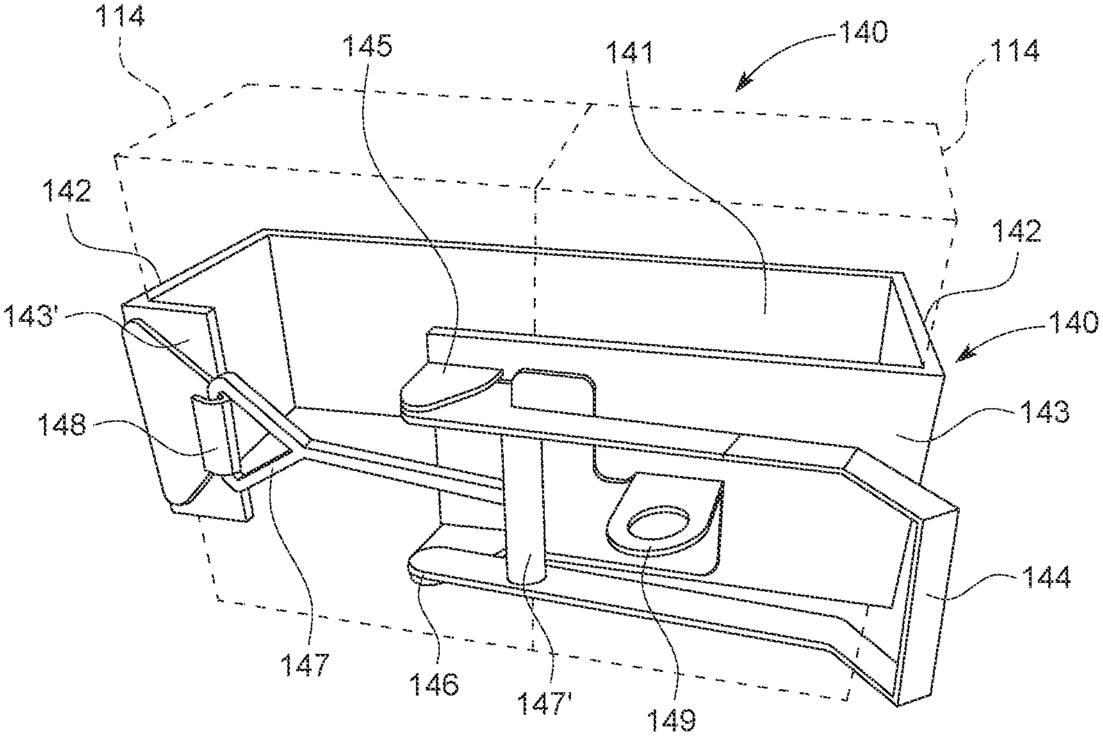
FIG. 5 presents a perspective view of the toggle clamp of FIGS. 4A through 4C disposed in a releasably secure engaged configuration about a portion of a frame member of each of adjacent ones of a plurality of fence panels, in accordance with the present invention.

FIG. 5 presents a perspective view of the toggle clamp 140 of FIGS. 4A through 4C disposed in a releasably secure engaged configuration about a portion of a frame member 114 of each of adjacent ones of a plurality of fence panels 112, in accordance with the present invention. As will be appreciated, once a toggle clamp 140 is positioned around adjacent frame members 114, 157' and/or panel interfaces 117, 129, handle 144 and yoke 147 may be pivoted towards a yoke interconnect 148 until the yoke 147 engages the yoke interconnect 148 at which point handle 144, and yoke 147 secured thereto, are pivoted back into a closed orientation, thereby releasably securing adjacent frame members 114, 157' and/or panel interfaces 117, 129 to one another. With reference again to the illustrative embodiment of FIG. 5, the toggle clamp 140 is disposed in a releasably secure engaged configuration relative to adjacent frame members 114, wherein the yoke 147 is secured to the yoke interconnect 148 and the handle 144, and the yoke 147 secured thereto, are positioned into a closed orientation. In at least one embodiment, a toggle clamp 140 includes a lock hasp 149 through which a padlock may be placed to prevent unintentional or unauthorized release of a toggle clamp 140 from a releasably secure engaged configuration relative to adjacent frame members 114, 157' and/or panel interfaces 117, 129.

A modular fence system 100 disposable into a freestanding enclosure 119 in accordance with at least one further embodiment of the present invention further comprises a drinking fountain assembly 150. A drinking fountain assembly 150 in accordance with the present invention includes at least one drinking fountain 151. In one further embodiment, a drinking fountain assembly 120 of a modular fence system 100 in accordance with the present invention comprises a plurality of drinking fountains 151.

Figure 6:
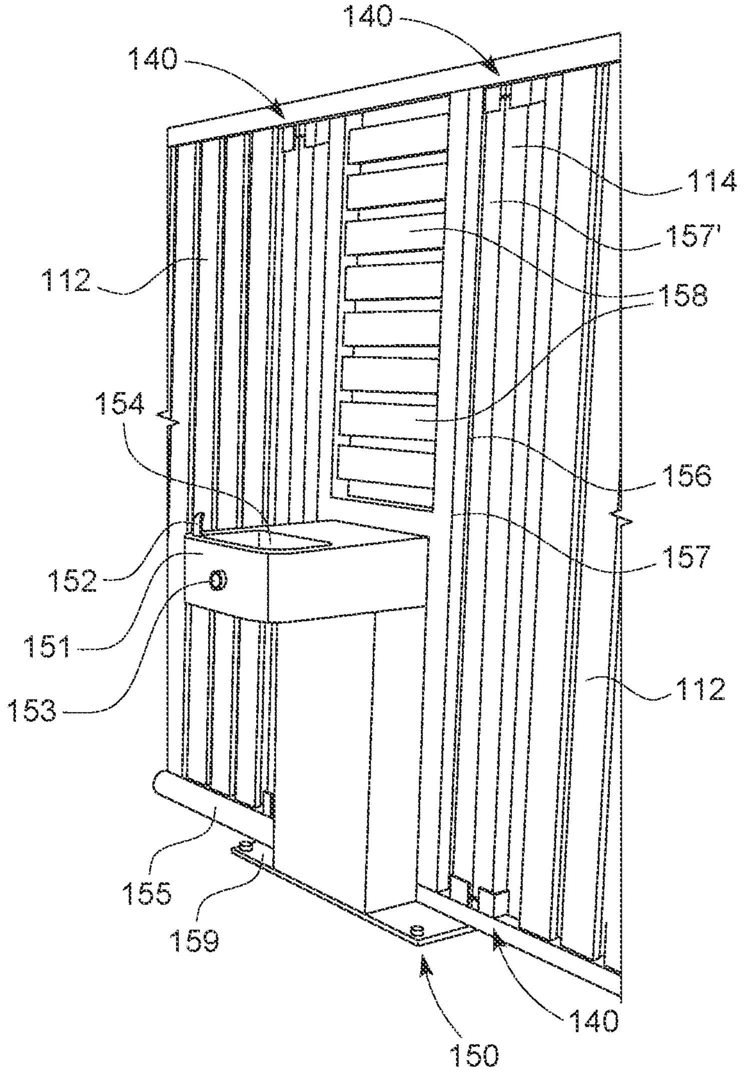
FIG. 6 presents a perspective view of one illustrative embodiment of a drinking fountain assembly of a modular fence system, in accordance with the present invention.

In at least one embodiment, a drinking fountain 151 comprises a dispenser 152 through which an amount of potable water will flow for consumption by a user upon actuation of an actuator 153, such as a button to be depressed or a handle to be turned as are commonly found on stationary drinking fountains. A drinking fountain 151 may further comprise a drain basis 154 to capture and divert an amount of potable water not consumed by a user or other liquid disposed of thereinto for transport to an appropriate disposal location. A drinking fountain assembly 150 in accordance with at least one embodiment of the present invention further comprises at least one composite fluid handling line 155. More in particular, a composite fluid handling line 155 includes a potable water supply line (not shown) utilized to supply an amount of potable water to a drinking fountain 151, such as is shown by way of example in FIG. 6, where it may be dispensed to a user through a dispenser 152 upon actuation of actuator 153, as described above. A pressurized potable water supply proximate a staging area may be utilized to provide potable water to a drinking foundation assembly 150, and more in particular, to one or more drinking fountains 151 of a drinking foundation assembly 150, via a potable water supply line in accordance with at least one embodiment of the present invention. Alternatively, a portable gravity feed potable water supply tank may be provided or a portable pressurized potable water supply tank having a portable potable water supply pump disposed in fluid communication therewith may be provided to supply potable water to one or more drinking fountains 151 of a drinking fountain assembly 150 in accordance with the present invention.

In one further embodiment, a composite fluid handling line 155 includes a drain line (not shown) therein to transport unconsumed potable water diverted thereinto via a drain basin 154 of a drinking fountain 151, in accordance with the present invention. More in particular, a drain line of a composite fluid handling line 155 may divert unconsumed portable water and/or other liquids disposed thereinto to a storm water drain proximate the staging area. In the event the staging area is remote, a drain line of a composite fluid handling line 155 may divert unconsumed portable water to a separate portable drainage storage tank or directly onto the ground proximate but outside of the freestanding enclosure 119.

Looking again to FIG. 6, a drinking water assembly 150 in at least one embodiment includes at least one fountain panel 156 having at least one drinking fountain 151 mounted thereto. In at least one further embodiment, a fountain panel 156 has a plurality of drinking fountains 151 mounted thereto. Similar to a fence panel 112 in accordance with the present invention, a fountain panel 156 includes a fountain frame 157 comprising a plurality of fountain frame members 157'. As with the frame members 114 of a fence panel 112, the fountain frame members 157' of a fountain frame 157 may be releasably interconnected to frame members 114 of adjacent fence panels 112 via one or more toggle clamp 140, as described hereinabove. Also similar to a fence panel 112, a fountain panel 156 may include one or more fountain slats 158, similar in structure and function to the plurality of fence slats 115 of each fence panel 112 in accordance with the present invention. A fountain base 159 is provided in at least one embodiment to provide a stabilizing support for a drinking fountain 151 in a freestanding enclosure 119 in accordance with the present invention.

Figure 7:
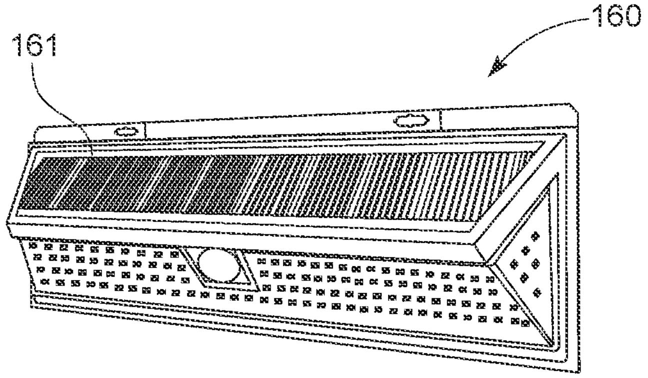
FIG. 7 presents a perspective view of one illustrative embodiment of a solar lighting assembly of a modular fence system, in accordance with the present invention.
Figure 8:
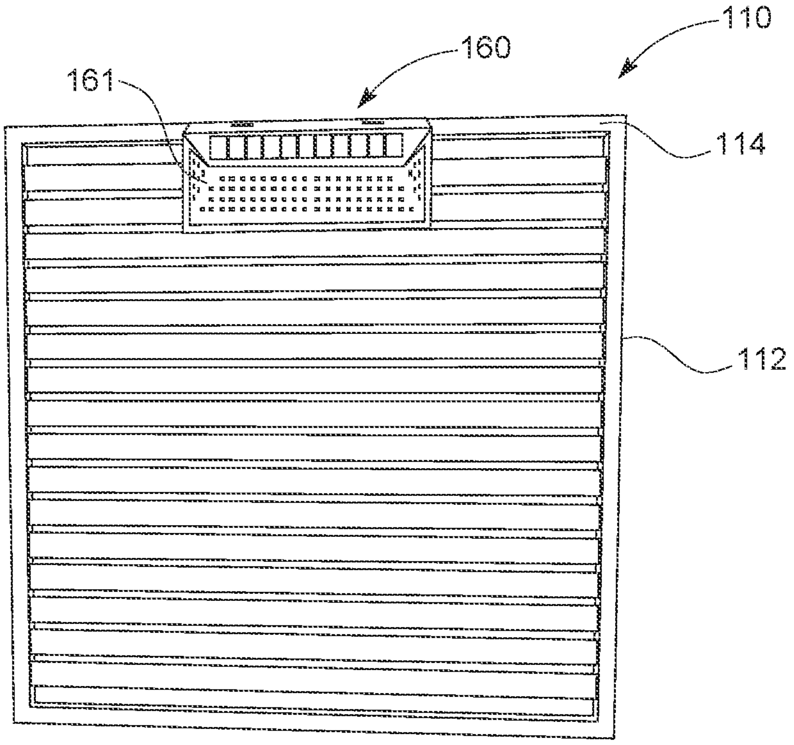
FIG. 8 presents an elevation of one illustrative embodiment of a fence panel of a modular fence system having a solar lighting assembly mounted to a portion thereof, in accordance with the present invention.

A modular fence system 100 in accordance with one further embodiment of the present invention comprises a solar lighting assembly 160. A solar lighting assembly 160 includes at least one fully contained and operational solar lighting unit 161, such as is shown in FIG. 7, which is configured to be mounted to a fence panel 112 of a fence panel assembly 110 in accordance with the present invention, as is shown in the illustrative embodiment of FIG. 8. In at least one further embodiment, a solar lighting assembly 160 comprising a plurality of solar lighting units 161 each configured to be mounted to a fence panel 112 of a fence panel assembly 110.

Figure 9:
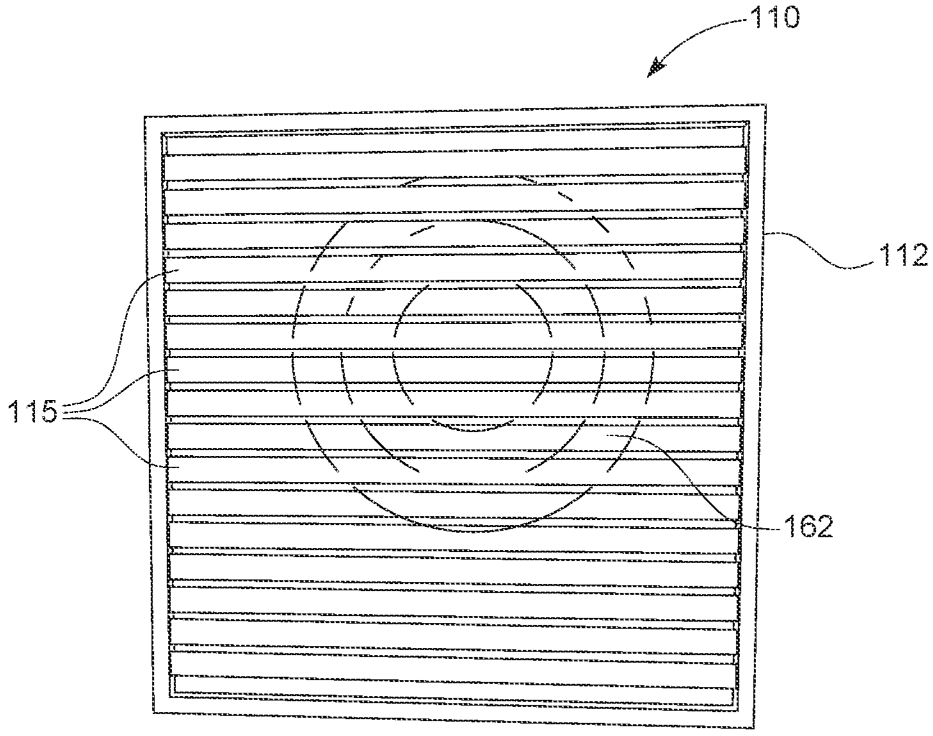
FIG. 9 presents an elevation of one illustrative embodiment of a fence panel of a modular fence system having a visible indicia displayed thereon, in accordance with the present invention.

A fence panel assembly 110 in accordance with one embodiment of the present invention may include at least one fence panel 112 having a visible indicia 162 applied directly thereon. More in particular, a visible indicia 162 may be applied directly onto one or more fence slats 115 of a fence panel 112 in accordance with the present invention, such as is shown, by way of example, in the illustrative embodiment of FIG. 9. It is to be appreciated that a visible indicia 162 in accordance with the present invention may include one or more announcements and/or advertisements of an event to be held in a freestanding enclosure 119, instructions to attendees, such as where to queue up, directions to an access way 168, admission documents required, etc., as well as corporate and/or community sponsorships, just to name a few.

Figure 11:
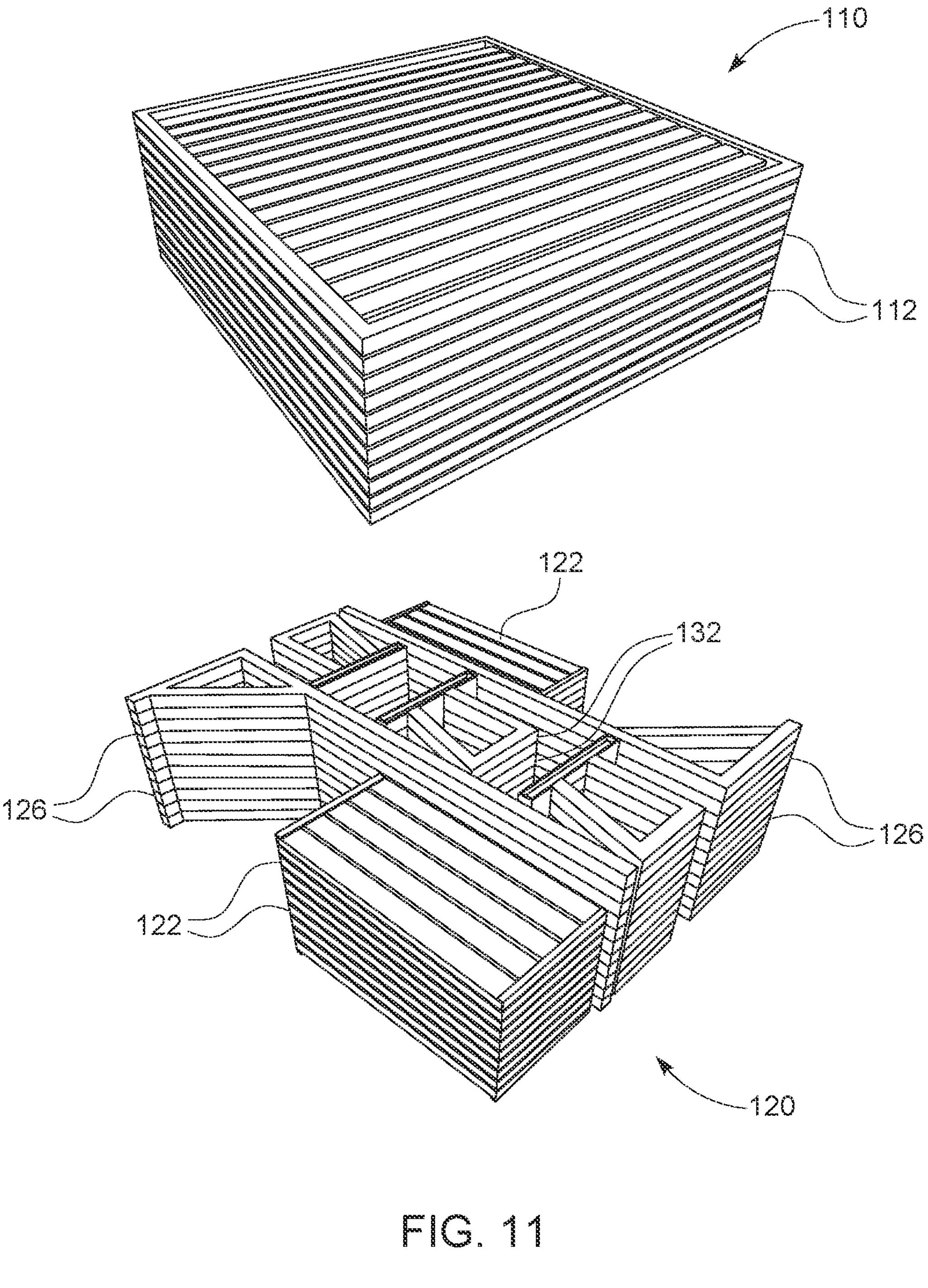
FIG. 11 presents a perspective view of one illustrative embodiment of a portion of a modular fence system disposed in an unassembled stacked orientation, in accordance with the present invention.

Looing next to FIG. 11, a perspective view of one illustrative embodiment of a portion of a modular fence system 100 in accordance with the present invention is shown disposed in an unassembled stacked orientation. As may be seen form FIG. 11, in one embodiment, a modular fence system 100 comprises a fence panel assembly 110 comprises a plurality of fence panels 112 stacked in a compact arrangement one on top of another, and a bench assembly 120 including a plurality of benches 122, end support units 126 and center support units 132, once again, stacked one on top of another so as to reduce the footprint required thereof to facilitate storage and/or transport.

Since many modifications, variations, and changes in detail can be made to the described embodiments of the invention, it is intended that all matters in the foregoing description and shown in the accompanying drawings be interpreted as illustrative and not in a limiting sense. Furthermore, it is understood that any of the features presented in the embodiments may be integrated into any of the other embodiments unless explicitly stated otherwise. The scope of the invention should be determined by the appended claims and their legal equivalents.

What is claimed is:

1. A modular fence system disposable into a freestanding enclosure on a supporting surface without tools, said system comprising:

a fence panel assembly comprising a plurality of fence panels each having a frame with a plurality of fence slats mounted therein;

a plurality of fence support units each having a frame interface and a frame support, each of said frame interfaces operably disposable between adjacent ones of said plurality of fence panels, and each of said frame supports positionable into a freestanding relation with the supporting surface; and a plurality of toggle clamps each disposable between an open disengaged configuration for positioning around a portion of said frame of adjacent ones of said plurality of fence panels and said frame interface of said fence support unit operably disposed thereinbetween, and a closed engaged configuration to maintain said portion of said frame of adjacent ones of said plurality of fence panels and said frame interface operably disposed thereinbetween in an interconnected freestanding configuration.

2. The modular fence system as recited in claim 1, wherein at least some of said plurality of fence slats are opaque.

3. The modular fence system as recited in claim 1, wherein each of said plurality of fence slats is opaque.

4. The modular fence system as recited in claim 1, wherein at least some of said plurality of fence slats comprise at least a portion of a visible indicia applied directly thereon.

5. The modular fence system as recited in claim 1, further comprising at least one closed wall comprising at least some of said plurality of fence panels interconnected to one another in said interconnected freestanding configuration.

6. The modular fence system as recited in claim 1, further comprising a plurality of closed walls each comprising at least some of said plurality of fence panels interconnected to one another in said interconnected freestanding configuration.

7. The modular fence system as recited in claim 6, wherein adjacent ones of some of said plurality of closed walls are interconnected to one another thereby at least partially defining said freestanding enclosure.

8. The modular fence system as recited in claim 7, further comprising at least one access wall interconnected between oppositely disposed ones of said plurality of closed walls, thereby further defining said freestanding enclosure.

9. The modular fence system as recited in claim 8, wherein said access wall comprises at least one access panel at least partially defining an access way in to and out of said freestanding enclosure.

10. The modular fence system as recited in claim 1, wherein each of said plurality of toggle clamps comprises a closed portion, oppositely disposed side portions, a fixed open portion and a free open portion, said free open portion being resilient to facilitate positioning said toggle clamp around a portion of said frame of adjacent ones of said plurality of fence panels and an interface operably disposed thereinbetween.

11. The modular fence system as recited in claim 1, wherein each of said plurality of toggle clamps comprises a handle interconnected thereto via a pivot joint, said handle disposable between an open position, thereby disposing said toggle clamp into said open disengaged configuration, and a closed position, thereby disposing said toggle clamp into said closed engaged configuration.

12. The modular fence system as recited in claim 11, wherein each of said oppositely disposed end support units comprises a fence panel interface disposable between said frame of each of different adjacent ones of said plurality of fence panels.

13. The modular fence system as recited in claim 1, further comprising a bench assembly having at least one bench mounted between an oppositely disposed pair of end support units.

14. The modular fence system as recited in claim 1, further comprising a bench assembly having a plurality of benches, wherein adjacent ones of said plurality of benches are interconnected to one another via a center support unit, and are mounted between an oppositely disposed pair of end support units.

15. The modular fence system as recited in claim 1, further comprising a drinking fountain assembly having at least one drinking fountain mounted to a fountain panel and disposable into an interconnected relation between oppositely disposed ones of said plurality of fence panels.

16. The modular fence system as recited in claim 1, further comprising a drinking fountain assembly having a plurality of drinking fountains each mounted to a different one of a plurality of fountain panels and each disposable into an interconnected relation between different oppositely disposed ones of said plurality of fence panels.

17. The modular fence system as recited in claim 1, further comprising a solar lighting assembly having at least one solar lighting unit mounted to a portion of one of said plurality of fence panels.

18. The modular fence system as recited in claim 1, further comprising a solar lighting assembly including a plurality of solar lighting units each mounted to a portion of a different one of said plurality of fence panels.

19. A modular fence system disposable into a freestanding enclosure on a supporting surface without tools, said system comprising:

a fence panel assembly comprising a plurality of fence panels each having a frame with a plurality of fence slats mounted therein;

a plurality of fence support units each having a frame interface and a frame support, each of said frame interfaces operably disposable between adjacent ones of said plurality of fence panels, and each of said frame supports positionable into a freestanding relation with the supporting surface;

a plurality of toggle clamps each disposable between an open disengaged configuration for positioning around a portion of said frame of adjacent ones of said plurality of fence panels and said frame interface of said fence support unit operably disposed thereinbetween, and a closed engaged configuration to maintain said portion of said frame of adjacent ones of said plurality of fence panels and said frame interface operably disposed thereinbetween in an interconnected freestanding configuration;

a plurality of closed walls each comprising at least some of said plurality of fence panels interconnected to one another in said interconnected freestanding configuration, wherein adjacent ones of some of said plurality of closed walls are interconnected to one another thereby at least partially defining said freestanding enclosure; and at least one access wall interconnected between oppositely disposed ones of said plurality of closed walls, said at least one access wall comprising at least one access panel at least partially defining an access way therethrough, thereby further defining said freestanding enclosure.

20. A modular fence system disposable into a freestanding enclosure on a supporting surface without tools, said system comprising:

a fence panel assembly comprising a plurality of fence panels each having a frame with a plurality of fence slats mounted therein;

a plurality of fence support units each having a frame interface and a frame support, each of said frame interfaces operably disposable between adjacent ones of said plurality of fence panels, and each of said frame supports positionable into a freestanding relation with the supporting surface;

a plurality of toggle clamps each disposable between an open disengaged configuration for positioning around a portion of said frame of adjacent ones of said plurality of fence panels and said frame interface of said fence support unit operably disposed thereinbetween, and a closed engaged configuration to maintain said portion of said frame of adjacent ones of said plurality of fence panels and said frame interface operably disposed thereinbetween in an interconnected freestanding configuration;

each of said plurality of toggle clamps comprising a closed portion, oppositely disposed side portions, a fixed open portion and a free open portion, said free open portion being resilient to facilitate positioning said toggle clamp around a portion of said frame of adjacent ones of said plurality of fence panels and said frame interface of said fence support unit operably disposed thereinbetween;

each of said plurality of toggle clamps further comprising a handle interconnected thereto via a pivot joint, said handle disposable between an open position, thereby disposing said toggle clamp into said open disengaged configuration, and a closed position, thereby disposing said toggle clamp into said closed engaged configuration;

a plurality of closed walls each comprising at least some of said plurality of fence panels interconnected to one another in said interconnected freestanding configuration, wherein adjacent ones of some of said plurality of closed walls are interconnected to one another thereby at least partially defining said freestanding enclosure; and at least one access wall interconnected between oppositely disposed ones of said plurality of closed walls, said at least one access wall comprising at least one access panel at least partially defining an access way therethrough, thereby further defining said freestanding enclosure.

* * * * *